United States Patent
Duffy et al.

(12)
(10) Patent No.: US 6,476,080 B2
(45) Date of Patent: Nov. 5, 2002

(54) BLOWING AGENT COMPOSITIONS CONTAINING HYDROFLUOROCARBONS AND A LOW-BOILING ALCOHOL AND/OR LOW-BOILING CARBONYL COMPOUND

(75) Inventors: John D. Duffy, La Wantzenau (FR); Warren H. Griffin, Saginaw, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/999,277

(22) Filed: Nov. 29, 2001

(65) Prior Publication Data

US 2002/0132868 A1 Sep. 19, 2002

Related U.S. Application Data

(60) Provisional application No. 60/257,483, filed on Dec. 21, 2000.

(51) Int. Cl.⁷ .................................................. C08J 9/14
(52) U.S. Cl. ............................ 516/12; 516/10; 521/88; 521/97; 521/98; 521/131
(58) Field of Search ................. 516/10, 12; 521/88, 521/97, 98, 131

(56) References Cited

U.S. PATENT DOCUMENTS

| | | |
|---|---|---|
| 4,214,054 A | 7/1980 | Watanabe et al. |
| 4,217,319 A | 8/1980 | Komori |
| 4,323,528 A | 4/1982 | Collins |
| 4,663,360 A | 5/1987 | Park et al. |
| 4,681,715 A | 7/1987 | Park et al. |
| 5,162,381 A | 11/1992 | Richard et al. |
| 5,182,308 A | 1/1993 | Voelker et al. |
| 5,278,196 A | 1/1994 | Robin et al. |
| 5,314,926 A | 5/1994 | Robin et al. |
| 5,334,337 A | 8/1994 | Voelker et al. |
| 5,405,883 A | 4/1995 | Park |
| 5,422,378 A | 6/1995 | Vo |
| 5,445,757 A | 8/1995 | Pennetreau |
| 5,496,866 A | 3/1996 | Sommerfeld et al. |
| 5,496,867 A | 3/1996 | Sommerfeld et al. |
| 5,624,970 A | 4/1997 | Sommerfeld et al. |
| 5,646,196 A | 7/1997 | Sommerfeld et al. |
| 5,688,431 A | 11/1997 | Minor |
| 5,776,389 A | 7/1998 | Chaudhary |
| 5,789,458 A | 8/1998 | Londrigan et al. |
| 5,837,743 A | 11/1998 | Londrigan et al. |
| 5,856,679 A | 1/1999 | Barthelemy et al. |
| 5,866,029 A | 2/1999 | Lund et al. |
| 5,877,226 A | 3/1999 | Tsuda et al. |
| 5,889,286 A | 3/1999 | Barthelemy et al. |
| 5,912,279 A | 6/1999 | Hammel et al. |
| 5,993,707 A | 11/1999 | Chaundhary et al. |
| 6,022,912 A | 2/2000 | Spitler et al. |
| 6,043,291 A | 3/2000 | Takeyaso et al. |
| 6,080,799 A | 6/2000 | Krueche et al. |
| 6,087,408 A | 6/2000 | Ide et al. |
| 6,086,784 A | 7/2000 | Barthelemy et al. |
| 6,123,881 A | 9/2000 | Miller et al. |
| 6,127,440 A | 10/2000 | Sanyasi |
| 6,166,109 A | 12/2000 | Spitler et al. |
| 6,187,831 B1 | 2/2001 | Miller et al. |
| 6,268,046 B1 | 7/2001 | Miller et al. |
| 6,274,640 B1 | 8/2001 | Miller et al. |

FOREIGN PATENT DOCUMENTS

| | | |
|---|---|---|
| DE | 44 39 082 A1 | 4/1997 |
| DE | 198 22 945 A1 | 11/1999 |
| EP | 0 557 533 A1 | 9/1993 |
| EP | 0 464 581 B1 | 2/1995 |
| EP | 0 842 972 A1 | 5/1998 |
| EP | 0 921 148 A1 | 6/1999 |
| EP | 0 922 554 A1 | 6/1999 |
| EP | 0 960 902 A1 | 12/1999 |
| EP | 1 095 969 A2 | 5/2001 |
| EP | 1 101 791 A1 | 5/2001 |
| JP | 10045935 A2 | 2/1998 |
| WO | WO 96/12758 | 5/1996 |
| WO | WO 96/14354 | 5/1996 |
| WO | WO 98/39378 | 9/1998 |
| WO | WO 99/36486 | 7/1999 |

*Primary Examiner*—Morton Foelak
(74) *Attorney, Agent, or Firm*—Steven W. Mork

(57) ABSTRACT

The present invention relates to blowing agent compositions that contain at least one hydrofluorocarbon having a boiling point of 30° C. or higher and lower than about 120° C., at least one hydrofluorocarbon having a boiling point lower than 30° C., and at least one component selected from low-boiling alcohols and low-boiling carbonyl compounds. The present invention also relates to processes for preparing polymeric foam using such blowing agent compositions, as well as polymeric foams and foamable polymer compositions containing such blowing agent compositions.

11 Claims, No Drawings

BLOWING AGENT COMPOSITIONS CONTAINING HYDROFLUOROCARBONS AND A LOW-BOILING ALCOHOL AND/OR LOW-BOILING CARBONYL COMPOUND

CROSS REFERENCE STATEMENT

This application claims the benefit of U.S. Provisional Application No. 60/257,483, filed Dec. 21, 2000.

BACKGROUND OF THE INVENTION

1. Field of the Invention

The present invention relates to a blowing agent composition containing a hydrofluorocarbon (HFC) having a boiling point of 30° C. or higher and lower than about 120° C. (mid-range low-boiling HFC), a HFC having a boiling point lower than 30° C. (low-range low-boiling HFC), and at least one component selected from low-boiling alcohols and low-boiling carbonyl compounds. The present invention further relates to polymeric foams and the use of such a blowing agent composition to produce polymeric foams, and foamable polymer compositions comprising a polymer that has such blowing agent compositions dispersed therein.

2. Description of Related Art

Low-boiling alcohols are useful components in blowing agent compositions for preparing polymeric foams. "Low-boiling alcohol" and "LBA" are interchangeable terms herein and refer to an alcohol having a boiling point lower than about 120° C. LBAs can plasticize a polymer (see, e.g., U.S. Pat. No. 4,663,360 column 12 lines 50–52), facilitating polymer expansion at lower pressures than a non-plasticized polymer. Furthermore, LBAs tend to maintain or increase foam cell sizes even at relatively high concentrations, concentrations where other blowing agents tend to act as nucleators and reduce foam cell sizes. As a result, one may use relatively high concentrations of alcohol to reduce foam density without reducing foam cell size. Reducing density without reducing cell size is attractive for preparing thermally insulating polymeric foam.

Unfortunately, alcohols have drawbacks when used as blowing agents. An alcohol can react with halogenated components that are present in the foam, such as halogenated flame retardants, to produce a corrosive acid. The acid tends to corrode metal equipment. Furthermore, alcohols can escape into the atmosphere whereby they contribute undesirably to volatile organic compound (VOC) emissions.

Low-boiling carbonyl compounds, such as ketones and aldehydes, can facilitate production of a polymeric foam similarly to alcohols, but do so without significantly contributing to acid production. "Low-boiling carbonyl compound" and "LBC" are interchangeable terms and refer to an aldehyde or ketone that has a boiling point lower than about 120° C. Unfortunately, residual LBCs can also escape into the atmosphere whereby they contribute undesirably to volatile organic compound (VOC) emissions.

Blowing agents comprising HFCs are gaining popularity as regulations encourage replacing hydrochlorofluorocarbon (HCFC) and chlorofluorocarbon (CFC) blowing agent components, both of which can contribute to ozone depletion. HFCs have a thermal conductivity lower than most polymers or blowing agents (other than HCFCs and CFCs) so HFC residuals in a polymeric foam can lower the foam's thermal conductivity.

Unfortunately, low-range low-boiling HFCs tend to escape from polymeric foam thereby causing an undesirable increase in polymeric foam thermal conductivity and organic emissions over time. Exploration of mid-range low-boiling HFCs such as 1,1,1,3,3-pentafluorobutane (HFC-365 mfc) as blowing agents is underway. Mid-range low-boiling HFCs can also reduce polymeric foam thermal conductivity and tend to reside within polymeric foam longer than low-range low-boiling HFCs.

A blowing agent composition that benefits from the advantages of a LBA and/or LBC compound yet has less of the detrimental affects of the alcohol and/or carbonyl compound is desirable. A blowing agent composition that further comprises HFCs to reduce the thermal conductivity through a polymeric foam is also desirable, particularly if a mid-range low-boiling HFC partially replaces a low-range low-boiling HFC.

DEFINITIONS

"Hydrofluorocarbon" and "HFC" are interchangeable terms and refer to an organic compound containing hydrogen, carbon, and fluorine, the compound being substantially free of halogens other than fluorine.

"Boiling point" refers to the boiling point at one atmosphere pressure.

"Mid-range low-boiling hydrofluorocarbon", "mid-range low-boiling HFC", and "MRLB HFC" are interchangeable terms and refer to a HFC that has a boiling point of 30° C. or higher and lower than about 120° C.

"Low-range low-boiling hydrofluorocarbon", "low-range low-boiling HFC", and "LRLB HFC" are interchangeable terms and refer to a HFC that has a boiling point lower than 30° C.

"Fresh" refers to within one month, preferably within one week, more preferably within one day, still more preferably within one hour, most preferably immediately after manufacture.

"LBA and/or LBC" means "LBA, LBC, or LBA and LBC".

A polymeric foam or blowing agent composition that is "essentially free" of a specified component or components refers to a polymeric foam or blowing agent composition, respectively, that contains ten weight-percent (wt %) or less, preferably five wt % or less, more preferably one wt % or less, still more preferably 0.5 wt % or less, most preferably zero wt % of the specified component(s).

BRIEF SUMMARY OF THE INVENTION

In a first aspect, the present invention is a blowing agent composition comprising: (a) at least one hydrofluorocarbon having a boiling point of 30° C. or higher and lower than about 120° C.; (b) at least one hydrofluorocarbon having a boiling point lower than 30° C.; and (c) at least one component selected from low-boiling alcohols and low-boiling carbonyl compounds. Embodiments of the first aspect include compositions that are essentially free of low-boiling carbonyl compounds and compositions that contain at least one of ethanol, acetone, and additional blowing agents. One preferred embodiment of the first aspect further comprises carbon dioxide at a concentration of less than 50 weight-percent of the composition. Another preferred embodiment of the first aspect comprises 1,1,1,3,3-pentafluorobutane, 1,1,1,2-tetrafluoroethane, ethanol, and carbon dioxide, wherein carbon dioxide is less than 50 weight-percent of the composition.

In a second aspect, the present invention is a process for preparing polymeric foam comprising the steps: (a) forming a foamable polymer composition from a polymer and the blowing agent composition of the first aspect; and (b) expanding said foamable polymer composition into a polymeric foam.

In a third aspect the present invention is a polymeric foam that comprises: (a) a polymer; (b) a hydrofluorocarbon having a boiling point of 30° C. or higher and lower than about 120° C; (c) a hydrofluorocarbon having a boiling point lower than 30° C; and (d) at least one component selected from low-boiling alcohols and low-boiling carbonyl compounds.

In a fourth aspect, the present invention is a foamable polymer composition comprising a polymer that has the blowing agent composition of the first aspect dispersed therein.

Surprisingly, low foam thermal conductivity and ease of processing associated with a blowing agent composition consisting of a LRLB HFC and a LBA and/or LBC is achievable by partially replacing at least one of the LRLB HFC, LBA and LBC with a MRLB HFC. Furthermore, one may achieve a lower foam thermal conductivity 90 days after formation by partially replacing at least one of LRLB HFC, LBA, and LBC with a MRLB HFC in the foam's blowing agent composition.

The blowing agent compositions of the present invention are particularly useful for preparing thermally insulating polymeric foam.

DETAILED DESCRIPTION OF THE INVENTION

This invention relates to a blowing agent composition comprising at least one MRLB HFC, at least one LRLB HFC, and at least one component selected from LBAs and LBCs.

Suitable LBAs include aliphatic alcohols having from one to five carbons ($C_1$-$C_5$) such as methanol, ethanol, n-propanol, and isopropanol. LBAs may or may not be anhydrous, but anhydrous (containing less than 1 weight-percent (wt %) water based on weight of alcohol) is preferred. The LBA is preferably ethanol or isopropanol, more preferably anhydrous ethanol.

Suitable LBCs include any ketone or aldehyde that has a boiling point lower than about 120° C. Illustrative LBCs include acetone, 2-butanone, and acetaldehyde.

The blowing agent composition may be free of LBA if a LBC is present, and may be free of LBC if a LBA is present, or may contain both a LBA and a LBC. The combined concentration of LBA and LBC, based on the blowing agent composition weight, is greater than zero wt %, preferably at least one wt %, more preferably at least five wt %, still more preferably at least 10 wt %; and typically 60 wt % or less, preferably 50 wt % or less, more preferably 40 wt % or less, still more preferably 20 wt % or less. LBA and/or LBC concentrations greater than 60 wt % tend to excessively plasticize the polymer, making processing difficult and result in inadequate polymeric foam thermal stability.

Suitable MRLB HFCs include any HFC having a boiling point of 30° C. or higher and lower than about 120° C. Examples of suitable MRLB HFCs include aliphatic compounds such as HFC-365 mfc, 1-fluorobutane, nonafluorocyclopentane, perfluoro-2-methylbutane, 1-fluorohexane, perfluoro-2,3-dimethylbutane, perfluoro-1,2-dimethylcyclobutane, perfluorohexane, perfluoroisohexane, perfluorocyclohexane, perfluoroheptane, perfluoroethylcyclohexane, perfluoro-1,3-dimethyl cyclohexane, and perfluorooctane; as well as aromatic compounds such as fluorobenzene, 1,2-difluorobenzene; 1,4-difluorobenzene, 1,3-difluorobenzene; 1,3,5-trifluorobenzene; 1,2,4,5-tetrafluorobenzene, 1,2,3,5-tetrafluorobenzene, 1,2,3,4-tetrafluorobenzene, pentafluorobenzene, hexafluorobenzene, and 1-fluro-3-(trifluoromethyl)benzene. HFC-365 mfc is particularly desirable due to its increasing availability and ease of use. Aromatic HFCs may also be attractive for preparing polymeric foams using an aromatic polymer if an enhanced compatibility between the HFC and polymer helps retain the HFC in the polymeric foam after formation. One advantage MRLB HFCs have over LRLB HFCS, in general, is that they typically remain longer within polymeric foam. HFC retention is attractive for slowing thermal conductivity increases and organic emissions associated with escaping HFC. MRLB HFCs are also easier to handle than LRLB HFCs because they are in a condensed phase at atmospheric pressure (760 mm mercury), therefore do not require liquefaction during the foaming process.

The blowing agent compositions of the present invention comprise a MRLB HFC at a concentration relative to blowing agent composition weight of greater than zero wt %, generally ten wt % or more, more generally five wt % or more, still more generally three wt % or more; and generally 40 wt % or less, more generally 60 wt % or less, still more generally 80 wt % or less, and most generally 95 wt % or less. At a concentration greater than 95 wt %, MRLB HFC will excessively plasticize the polymer making foaming difficult.

The blowing agent composition also comprises a LRLB HFC. The LRLB HFC typically acts both as a blowing agent and as a thermal insulator in the polymeric foam. LRLB HFCs have low thermal conductivities, similar to the MRLB HFCs. Therefore, residual LRLB HFC in blown polymeric foam helps reduce the foam's thermal conductivity. LRLB HFC residuals generally occupy cell spaces while MRLB HFC residuals generally condense onto or into cell walls. Therefore, LRLB HFCs are generally more efficient at reducing polymeric foam thermal conductivity than MRLB HFCs.

Suitable LRLB HFCs include methyl fluoride, difluoromethane (HFC-32), perfluoromethane, ethyl fluoride (HFC-161); 1,1-difluoroethane (HFC-152a); 1,1,1-trifluoroethane (HFC-143a); 1,1,2,2-tetrafluoroethane (HFC-134); 1,1,1,2-tetrafluoroethane (HFC-134a); pentafluoroethane (HFC-125), perfluoroethane, 2,2-difluoropropane (HFC-272fb), 1,1,1-trifluoropropane (HFC-263fb), 1,1,1,2,3,3,3-heptafluoropropane (HFC-227ea), 1,1,1,3,3-pentafluoropropane (HFC-245fa), and mixtures thereof. A preferred LRLB HFC is HFC-134a.

The concentration of LRLB HFC in the blowing agent composition, relative to the total composition weight, is greater than zero wt %, often 10 wt % or more, more often 15 wt % or more, still more often 30 wt % or more, most preferably greater than 50 wt %.

The upper concentration limit of LRLB HFC depends primarily on the solubility limit of the LRLB HFC in the polymer. Concentrations exceeding the solubility limit of a LRLB HFC in the polymer, in conjunction with the rest of the blowing agent composition, result in excessive nucleation during polymer expansion (blowing of the foam). A skilled artisan can determine without undue experimentation an upper limit for a LRLB HFC in a given blowing agent composition. The concentration of LRLB HFC is 95 wt % or less (relative to blowing agent composition weight), desirably 80 wt % or less, preferably 75 wt % or less, more preferably 60 wt % or less.

The blowing agent composition preferably comprises at least one additional blowing agent, although additional blowing agents are not necessary. Additional blowing agents are useful for decreasing foam density. Proper choice of additional blowing agents may increase total moles of blowing agent without decreasing cell size, increasing density, and/or decreasing dimensional stability.

Suitable additional blowing agents include inorganic and organic blowing agents as well as chemical blowing agents that decompose into inorganic and/or organic blowing agents. Suitable inorganic blowing agents include nitrogen, argon, water, air, and helium. Organic blowing agents include carbon dioxide ($CO_2$), ethers, aliphatic hydrocarbons having from one to nine carbons ($C_{1-9}$), fully and partially halogenated $C_{1-4}$ aliphatic hydrocarbons. Aliphatic hydrocarbons include methane, ethane, propane, n-butane, isobutane, n-pentane, isopentane, neopentane, cyclobutane, and cyclopentane. Preferred additional blowing agents include water, $CO_2$, isobutane, and cyclopentane. The most preferred additional blowing agent is $CO_2$.

In general, the concentration of any individual additional blowing agent in a blowing agent composition is below the solubility limit of that blowing agent in the polymer at a process temperature (typically the glass transition temperature of the polymer) and in the presence of the entire blowing agent composition. In general, additional blowing agents comprise 50 wt % or less, 30 wt % or less, even 10 wt % or less of the blowing agent composition.

The sum of $CO_2$, MRLB HFC, LRLB HFC, LBA, LBC, and any additional blowing agents account for 100 wt % of the blowing agent composition.

An example of a preferred blowing agent composition is 45–60 wt % HFC-134a, 25–40 wt % HFC-365 mfc, 10–20 wt % ethanol, and 1–10 wt % $CO_2$.

The present invention also relates to the use of a blowing agent composition comprising a LBA and/or LBC, a MRLB HFC, and a LRLB HFC to prepare foamable polymer compositions and polymeric foam.

Any conventional blown foam process is suitable for preparing blown polymeric foam using a blowing agent composition of this invention. Generally, polymeric foam is prepared by plasticizing a polymer, incorporating therein a blowing agent composition at an initial pressure to form a foamable composition, and then exposing the foamable composition to a foaming pressure that is lower than the initial pressure and allowing the foamable composition to expand into polymeric foam. Typically, incorporate the blowing, agent composition at a concentration, relative to weight parts of polymer resin, of greater than zero parts-per-hundred (pph), preferably greater than 5 pph; and typically less than 25 pph, preferably less than 20 pph, and more preferably less than 15 pph to form a foamable polymer composition. Using greater than 25 pph blowing agent composition can produce foam with an undesirable density and cell size.

A typical process for forming a foamable polymer composition includes: (1) plasticizing a polymer, typically by heating it to a processing temperature at or above its glass transition temperature or melting temperature, to form a plasticized polymer; and (2) adding a blowing agent composition to the plasticized polymer at an initial pressure to form a foamable polymer composition. Add components of the blowing agent composition individually or in any combination. Incorporate the blowing agent composition into the plasticized polymer by a batch or continuous process, using conventional equipment such as an extruder or mixer blender. The initial pressure is sufficient to prevent substantial expansion of the foamable composition and to generally disperse the blowing agent composition into the plasticized polymer. The initial pressure is usually, though not necessarily, greater than atmospheric pressure.

Foam the foamable polymer composition by either reducing the pressure around the foamable composition to a foaming pressure or by transporting the foamable composition into a foaming zone at a foaming pressure. The foaming pressure is lower than the initial pressure and can be above or below atmospheric pressure, but is typically atmospheric pressure. Blowing agents in the blowing agent composition expand at the foaming pressure, expanding the foamable polymer composition into a polymeric foam.

Cooling a heat plasticized foamable composition below the processing temperature prior to exposing the foamable composition to the foaming pressure is useful for optimizing foam properties. Cool the foamable composition in an extruder or other mixing device or in separate heat exchangers.

A skilled artisan recognizes there are many variations of the general procedure as well as other ways to prepare polymeric foam that are suitable for purposes of the present invention. For example, U.S. Pat. No. 4,323,528, herein incorporated by reference, discloses a process for making polymeric foams via an accumulating extrusion process. The process comprises: 1) mixing a thermoplastic material and a blowing agent composition to form a foamable polymer composition; 2) extruding the foamable polymer composition into a holding zone maintained at a temperature and pressure that precludes foaming of the foamable polymer composition, the holding zone having a die defining an orifice opening into a zone of lower pressure and an openable gate closing the die orifice; 3) periodically opening the gate; 4) applying mechanical pressure substantially concurrently with (3) by means of a movable ram on the foamable polymer composition to eject it from the holding zone through the die orifice into the zone of lower pressure, and 5) allowing the ejected foamable polymer composition to expand to form a polymeric foam in the zone of lower pressure.

Suitable polymers for use in the present invention include thermoplastic polymers. Suitable thermoplastic polymers include those selected from a group consisting of vinyl aromatic polymers such as polystyrene; rubber-modified vinyl aromatic polymers such as high impact polystyrenes (HIPS); vinyl aromatic copolymers such as styrene/acrylonitrile or styrene/butadiene copolymers; hydrogenated vinyl aromatic polymers and copolymers such as hydrogenated polystyrene and hydrogenated styrene/butadiene copolymers; alpha-olefin homopolymers such as low density polyethylene, high density polyethylene and polypropylene; linear low density polyethylene (an ethylene/octene-1 copolymer) and other copolymers of ethylene with a copolymerizable, mono-ethylenically unsaturated monomer such as an alpha-olefin having from 3 to 20 carbon atoms; copolymers of propylene with a copolymerizable, mono-ethylenically unsaturated monomer such as an alpha-olefin having from 4 to 20 carbon atoms, copolymers of ethylene with a vinyl aromatic monomer, such as ethylene/styrene interpolymers; ethylene/propylene copolymers; copolymers of ethylene with an alkane such as an ethylene/hexane copolymer; thermoplastic polyurethanes (TPU's); and blends or mixtures thereof, especially blends of polystyrene and an ethylene/styrene interpolymer.

Other suitable polymers include polyvinyl chloride, polycarbonates, polyamides, polyimides, polyesters such as polyethylene terephthalate, polyester copolymers and modified polyesters such as polyethylene terephthalate-glycol (PETG), phenol-formaldehyde resins, thermoplastic polyurethanes (TPUs), biodegradable polysaccharides such as starch, and polylactic acid polymers and copolymers.

The polymer is preferably polyethylene (PE), polystyrene (PS), polypropylene (PP), a blend of PS and an ethylene/styrene interpolymer (ESI), a blend of ESI and PE, a blend of ESI and PP, a blend of PS, PE and ESI or a blend of ESI with any one or more polyolefin or ethylene/alpha-olefin copolymers, terpolymers or interpolymers produced using a metallocene catalyst or a constrained geometry catalyst (such as The Dow Chemical Company's INSITE™ catalysts, INSITE is a trademark of The Dow Chemical Company).

Additional additives, such as those commonly used in preparing polymeric foam, can be included in the foamable composition. Additional additive may include pigments, viscosity modifiers, flame retardants, infrared blockers (e.g. carbon black and graphite), nucleating agents, permeation modifiers, and extrusion aids. Interestingly, inclusion of nucleating agents is not necessary to prepare polymeric foam using blowing agent compositions of the present invention.

The present invention further relates to polymeric foam comprising a polymer, a MRLB HFC, a LRLB HFC, and a LBA and/or LBC. Typically, a polymeric foam contains residuals of the blowing agent used in its manufacture. However, blowing agents tend to escape from polymeric foam and air tends to permeate into polymeric foam over time. Therefore, preferably characterize a polymeric foam within the timeframe set forth as "fresh", most preferably immediately after manufacture, to ensure blowing agents have not escaped and air has not contaminated the foam. A polymeric foam may further contain additional blowing agents, such as $CO_2$, when they are included in the blowing agent composition used to make the foam. One may identify the presence of blowing agent residuals using standard analytical techniques, such as gas chromatography.

Polymeric foams of the present invention may take any physical configuration known in the art, such as sheet, rod, plank, or coalesced parallel strands and/or sheets. The foam is preferably a plank, more preferably a plank having a cross-section of 30 square centimeters ($cm^2$) or more and a cross-section thickness in a minor dimension of 0.25 inch (6.4 millimeters (mm)) or greater, more preferably 0.375 inch (9.5 mm) or greater, and still more preferably 0.5 inch (12.7 mm) or greater. A polymeric foam having a minor dimension of up to 8 inches (200 mm) is possible. The upper limit for the minor dimension is limited by foaming equipment limitations. Given large enough equipment, a minor dimension above 8 inches (200 mm) is conceivable.

Polymeric foams of the present invention preferably have a density of 10 kilograms per cubic meter ($kg/m^3$) or greater, normally 25 $kg/m^3$ or greater and normally 100 $kg/m^3$ or less, more often 45 $kg/m^3$ or less. Polymeric foams having a density below 10 $kg/m^3$ generally lack a desired structural integrity. Polymeric foams of the present invention may have a density up to, but not including, that of a combination of the polymer and additives used in preparing the foam.

Polymeric foam of the present invention can be open-celled (greater than 20 percent (%) open-celled) or close-celled (less than 20% open-celled), but foam that is less than 10% open-celled is preferable because it generally has a lower thermal conductivity. Determine percent open cell according to ASTM D2856-A. Typically, a polymeric foam of the present invention has a thermal conductivity 60 days after preparation, preferably 90 days after preparation (as determined according to ASTM method C-518-98 using a sample temperature of 24° C.) of 35 milliwatt per meter-Kelvin (mW/m·K) or less, preferably 30 mW/m·K or less.

Polymeric foams of the present invention have an average cell size greater than 0.05 millimeters (mm), preferably greater than 0.075 mm, more preferably greater than 0.1 mm, and less than 2 mm, preferably less than 1.2 mm. Determine average cell size using ATSM method D3576 with the following modifications: (1) image a foam using optical or electron microscopy rather than projecting the image on a screen; and (2) scribe a line of known length that spans greater than 15 cells rather than scribing a 30 mm line.

The following examples further illustrate, but do not limit, the scope of the invention.

COMPARATIVE EXAMPLE (COMP EX) A AND EXAMPLE (EX) 1

Add 100 parts by weight of PS (F168 PS resin from The Dow Chemical Company, 168,000 weight-average molecular weight) together with 1.2 parts per hundred (pph) hexabromocyclododecane (HBCD), 0.15 pph tetrasodiumpyrophosphate (TSPP), 0.15 pph barium stearate, 0.15 pph of blue concentrate (20 wt % copper phthalocyanine in PS by weight of concentrate), and 0.2 pph linear low-density PE 2247a (from The Dow Chemical Company) into a 64 mm single-screw extruder and heat to 200° C. to make a molten mixture. Determine pph based on weight of PS.

For Comp Ex A, add a blowing agent composition consisting of 73 wt % HFC-134a, 19 wt % anhydrous ethanol, and 8 wt % $CO_2$ (where wt % is relative to total blowing agent composition weight) to the molten mixture at an initial pressure of 14.5 megapascals (MPa) to form a foamable polymer composition. The total amount of blowing agent in Comp Ex A is 8.54 pph based on PS weight, or 0.12 moles per 100 grams of PS (mol/100 gPS).

For Ex 1, add a blowing agent composition consisting of 60 wt % HFC-134a, 16 wt % anhydrous ethanol, 8 wt % $CO_2$, and 16 wt % HFC-365 mfc (where wt % is relative to total blowing agent composition weight) to the molten mixture at an initial pressure of 13.2 MPa to form a foamable polymer composition. The total amount of blowing agent in Ex 1 is 8.86 pph based on PS weight, or 0.12 mol/100 gPS.

For both Comp Ex A and Ex 1, pass the foamable polymer composition through a series of heat exchangers to cool the foamable polymer composition to approximately 125° C. Expand the foamable polymer composition through a slit die (50 mm wide with a 2 mm gap) to a zone at atmospheric pressure. Shape the expanding foam into boards approximately 30 mm thick and 200 mm wide.

Table 1 contains foam density and thermal conductivity values as well as residual blowing agent concentration for both Comp Ex A and Ex 1. Measure foam density, after removing foam skins, according to ASTM method D-1622-98. Measure thermal conductivity on Comp Ex A and Ex 1 immediately after manufacturing (fresh lambda) and 90 days after manufacturing (90 day lambda) according to ASTM method C518-98 (at 24° C.).

Measure residual blowing agent concentration using gas chromatography with mass selective detection (GC/MSD). Prepare sample for GC/MSD by dissolving between 0.46 and 0.54 grams of a foam into a vial continuing five milliliters of tetrahydrofuran. Add ten millimeters of methanol to precipitate polymer. Inject THF/methanol supernatant directly into a Hewlett-Packard 5890II gas chromatograph equipped with a Hewlett-Packard 5971A mass selective detector. Use a DB-5 column (J & W Scientific Company, 30 meters by 0.25 mm diameter with 0.25 micron coating thickness). Instrument settings are: column pressure (5 psi), sample wash (2), sample pumps (4), viscosity (0), solvent A (2), solvent B (2), purge B (off), detector temperature (260° C.), injector temperature (260° C.), oven equilibration (0.50 minutes), oven program (50° C. for 2 minutes then ramp 15° C./minute to 65° C. and hold for 2 minutes). Detector settings are: solvent delay (0), EM absolute (1360), low mass (35), high mass (100), EMV offset (0), Sampling (2), scan/second (10.2), voltage (1360), threshold (150). Monitor ion mass 83 for HFC-134a, ion mass 65 for HFC-365 mfc, and ion mass 43 for-ethanol.

This method does not detect (ND) $CO_2$, so no $CO_2$ values are in Table 1. Measure residual blowing agent concentration on 125–130 days after manufacture. Essentially all $CO_2$ is expected to escape from the foams prior to measuring residual blowing agent concentrations.

Foam density is in pounds-per-cubic foot (pcf) and kilograms-per-cubic meter (kg/m$^3$). The pph values in Table 1 are relative to PS resin weight. Thermal conductivities are in milliWatt per meter-Kelvin (mW/m*K).

TABLE 1

| Measurement | Units | Comp Ex A | Ex 1 |
|---|---|---|---|
| Foam Density | kg/m$^3$ | 39.1 | 37.3 |
|  | (pcf) | (2.44) | (2.33) |
| Residual HFC-134a | pph | 4.37 | 3.75 |
| Residual HFC-365mfc | pph | 0.00 | 1.11 |
| Residual Ethanol | pph | 0.00 | 0.00 |
| Residual $CO_2$ | pph | ND | ND |
| Residual Total Blowing Agent | pph | 4.37 | 4.86 |
| % Total Blowing Agent Remaining | % | 51 | 55 |
| Fresh Lambda | mW/m*K | 21.5 | 21.6 |
| 90 Day Lambda | mW/m*K | 27.8 | 27.4 |

A comparison of Ex 1 to Comp Ex A illustrates that thermal conductivity is not significantly affected in a PS foam by reducing ethanol and HFC-134a and including HFC-365 mfc in a blowing agent composition used to prepare the PS foam. At the same time, Ex 1 demonstrates more residual blowing agent than Comp Ex B, illustrating an improved retention of blowing agent composition and therefore less blowing agent emissions with the HFC-365 mfc blowing agent formulation over the blowing agent formulation free of HFC-365 mfc.

Ex 1 further illustrates that HFC-365 mfc remains in a PS foam longer than HFC-134a. 83% of the HFC-365 mfc in the blowing agent composition remains in the foam after 125 days, as compared to 71% of the HFC-134a.

COMP EX B AND EX 2–6

Prepare Comp Ex B and Ex 2–6 in a manner similar to Comp Ex A and Ex 1 except use blowing agent compositions and blowing agent addition pressures as in Table 2. Comp Ex A is free from HFC-365 mfc and Ex 2–6 include HFC-365 mfc as a partial replacement for HFC-134a, ethanol, and water.

Blowing agent concentrations are in wt % relative to PS weight (values in parentheses are relative to total blowing agent weight). Initial pressure is in MPa. Total blowing agent concentration is in pph relative to PS resin weight and in moles per hundred grams of PS (mol/100 gPS).

TABLE 2

| Measurement | Comp Ex B | Ex 2 | Ex 3 | Ex 4 | Ex 5 | Ex 6 |
|---|---|---|---|---|---|---|
| HFC-134a, in wt % | 6.15 (66) | 5.40 (55) | 4.77 (47) | 5.28 (59) | 4.79 (49) | 4.76 (47) |
| HFC-365mfc, in wt % | 0.00 (0) | 1.77 (18) | 2.65 (26) | 1.34 (15) | 2.66 (27) | 3.09 (30) |
| Ethanol, in wt % | 2.23 (24) | 1.77 (18) | 1.77 (18) | 1.43 (16) | 1.42 (15) | 1.41 (14) |
| $CO_2$, in wt % | 0.71 (8) | 0.71 (7) | 0.71 (7) | 0.72 (8) | 0.71 (7) | 0.71 (7) |
| Water, in wt % | 0.19 (2) | 0.16 (2) | 0.17 (2) | 0.16 (2) | 0.16 (2) | 0.16 (2) |
| Total blowing agent concentration (in pph) | 9.28 | 9.81 | 10.07 | 8.93 | 9.74 | 10.13 |
| (in mol/100 gPS) | 0.15 | 0.14 | 0.14 | 0.13 | 0.14 | 0.14 |
| Initial pressure (MPa) | 10.8 | 12.1 | 14.9 | 12.9 | 11.6 | 10.9 |

Measure foam density, fresh lambda and 90 day lambda as in Ex 1. Also measure how much of each blowing agent remains in the foams between 124 and 128 days after manufacture (see Table 3 for how many days for each foam). Table 3 contains these values for Comp Ex B and Ex 2–6. Determine residual blowing agent concentrations as in Comp Ex A and Ex 1. $CO_2$ is not detectable, nor is water, when measuring residual blowing agent. For determining total blowing agent concentration in Table 3, assume both $CO_2$ and water has escaped from the foams.

Foam density is in kg/m$^3$ (values in parentheses are pcf). Concentrations are in wt % relative to PS resin, thermal conductivities are in mW/m*K. Total blowing agent is in pph relative to PS resin weight.

TABLE 3

| Measurement | Comp Ex B | Ex 2 | Ex 3 | Ex 4 | Ex 5 | Ex 6 |
|---|---|---|---|---|---|---|
| Foam Density, in kg/m$^3$ (pcf) | 34.0 (2.12) | 34.6 (2.16) | 34.5 (2.15) | 37.2 (2.32) | 36.2 (2.26) | 36.4 (2.27) |
| Days prior to Testing | 128 | 125 | 126 | 124 | 126 | 125 |
| Residual HFC-134a, in wt % | 4.35 | 3.97 | 3.29 | 3.86 | 3.78 | 3.49 |
| Residual HFC-365mfc, in wt % | 0.00 | 1.56 | 2.05 | 1.23 | 2.30 | 2.47 |
| Residual Ethanol, in wt % | 0.00 | 0.00 | 0.00 | 0.00 | 0.00 | 0.00 |
| Residual $CO_2$, in wt % | ND | ND | ND | ND | ND | ND |
| Residual Water, in wt % | ND | ND | ND | ND | ND | ND |
| Residual Total Blowing Agent, in pph | 4.35 | 5.53 | 5.34 | 5.09 | 6.08 | 5.96 |
| % HFC-134a remaining | 71 | 74 | 69 | 73 | 79 | 73 |
| % HFC-365mfc remaining | — | 88 | 77 | 92 | 86 | 80 |
| % Total Blowing Agent Remaining | 47 | 56 | 53 | 57 | 62 | 59 |
| Fresh Lambda, in mW/m * K | 21.8 | 22.3 | 21.9 | 22.0 | 21.5 | 22.5 |
| 90 Day Lambda, in mW/m * K | 28.4 | 27.7 | 27.5 | 27.5 | 27.3 | 27.3 |

Ex 2–6 illustrate that partially replacing HFC-134a, ethanol, $CO_2$, and water with HFC-365 mfc in a blowing agent composition for polystyrene foam can both a lower 90 day lambda value and increase blowing agent composition remaining in the foam.

Ex 2–6 further illustrate that HFC-365 mfc escapes from a polymeric foam to a lesser extent than HFC-134a.

Similar advantages are expected upon replacing other LRLB HFCs, LBAs and LBCs in blowing agent compositions and when preparing foams from polymers other than PS.

COMP EX C AND EX 7

Melt 100 pph PS resin (XZ40 PS resin from The Dow Chemical Company) in a 50 mm single screw extruder at 200° C. together with 2.8 parts per hundred (pph) hexabromocyclododecane, 0.15 pph copper phthalocyanine concentrate (20 wt % copper phthalocyanine in PS resin), 0.2 pph barium stearate, 0.4 pph linear low density polyethylene (DOWLEX® 2247A, DOWLEX is a trademark of The Dow Chemical Company), and 0.15 pph tetrasodiumpyrophosphate to form a polymer melt. All pph values are relative to PS resin weight. XZ40 PS resin is a blend having a weight average molecular weight ($M_w$) of 151,000; a polydispersity ($M_w/M_n$) of 3.1; and a melt flow index (MFI) of 33 grams per 10 minutes (g/10 min). Determine MFI using ASTM method D-1238 (190° C., 5 kg load).

Inject a blowing agent composition (see below) into the polymer melt at a pressure of 164 bar (16.4 megaPascals (MPa)) and mix to form a foamable polymer composition. Cool to 125° C. and extrude the foamable polymer composition through slit die (50 mm wide with a 0.8 mm opening) to atmospheric pressure to form a 30 mm thick and 180 mm wide polymeric foam.

The blowing agent composition (in wt % relative to PS resin weight and, in parentheses, relative to total blowing agent weight) and resulting foam parameters for Comp Ex C and Ex 7 are in Table 4.

TABLE 4

| Measurement | Comp EX C | Ex 7 |
| --- | --- | --- |
| HFC-245fa concentration, in wt % | 2.8 (38) | 3.0 (33) |
| HFC-365mfc concentration, in wt % | 0 (0) | 2.5 (28) |
| Ethanol concentration, in wt % | 1.4 (19) | 1.0 (11) |
| $CO_2$, in wt % | 3.2 (43) | 2.5 (28) |
| Total blowing agent, in pph relative to PS weight | 7.4 | 9 |
| Total blowing agent in mol/100 g PS | 0.12 | 0.12 |
| Density, in kg/m³ | 33 | 34 |
| Cell Size, in mm | 0.3 | 0.3 |
| 90-Day Lambda*, in mW/m*K | 33 | 31 |

* Determine lambda values for Comp Ex C and Ex 7 according to standard method EN28301 using a sample temperature of 10° C.

Ex 7 illustrates that partially replacing $CO_2$, ethanol, and an LRLB HFC (HFC-245 fa) with an MRLB HFC (HFC-365 mfc) while keeping the total moles of blowing agent constant can reduce a foam's thermal conductivity 90 days after manufacturing.

Expect similar results as those for Ex 1–7 when using other polymers, blowing agent compositions and additives.

What is claimed is:

1. A blowing agent composition comprising:
   (a) at least one hydrofluorocarbon having a boiling point of 30° C. or higher and lower than about 120° C;
   (b) at least one hydrofluorocarbon having a boiling point lower than 30° C; and
   (c) at least one component selected from low-boiling alcohols and low-boiling carbonyl compounds.

2. The composition of claim 1, wherein the composition is essentially free of low-boiling carbonyl compounds.

3. The composition of claim 1, wherein the low-boiling alcohol is ethanol.

4. The composition of claim 1, wherein the low-boiling carbonyl compound is acetone.

5. The composition of claim 1, further comprising at least one additional blowing agent selected from a group consisting of carbon dioxide, nitrogen, argon, water, air, helium, ethers, methane, ethane, propane, n-butane, isobutane, n-pentane, isopentane, neopentane, cyclobutane, and cyclopentane; wherein additional blowing agent(s) comprise 50 weight-percent or less of the blowing agent composition.

6. The composition of claim 1, further comprising carbon dioxide wherein said carbon dioxide is 50 weight-percent or less of the blowing agent composition.

7. The composition of claim 1, wherein (a) is 1,1,1,3,3-pentafluorobutane.

8. The composition of claim 1, wherein (b) is 1,1,1,2-tetrafluoroethane.

9. The blowing agent composition of claim 1, further comprising water.

10. The blowing agent composition of claim 1, wherein at least one of (a) is 1,1,1,3,3-pentafluorobutane; at least one of (b) is 1,1,1,2-tetrafluoroethane; and at least one of (c) is ethanol.

11. The blowing agent composition of claim 10; further comprising 50 weight-percent or less carbon dioxide, based on blowing agent composition weight.

* * * * *